(12) United States Patent
Inayoshi et al.

(10) Patent No.: US 7,490,855 B2
(45) Date of Patent: Feb. 17, 2009

(54) SHOCK-ABSORPTION STEERING DEVICE (75) Inventors: Hidetoshi Inayoshi, Nukata-gun (JP); Morito Oshita, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 444 days.

(21) Appl. No.: 11/437,653

(22) Filed: May 22, 2006

(65) Prior Publication Data
US 2006/0290129 A1 Dec. 28, 2006

(30) Foreign Application Priority Data
May 26, 2005 (JP) ............................. 2005-154346

(51) Int. Cl.
*B62D 1/18* (2006.01)
(52) U.S. Cl. ..................................... 280/777
(58) Field of Classification Search ................. 280/777
See application file for complete search history.

(56) References Cited

U.S. PATENT DOCUMENTS

| | | | |
|---|---|---|---|
| 4,813,910 A * | 3/1989 | Stone .......................... 464/162 |
| 4,901,592 A * | 2/1990 | Ito et al. ........................ 74/492 |
| 4,989,898 A * | 2/1991 | Yamaguchi et al. .......... 280/777 |
| 4,991,871 A * | 2/1991 | Sadakata ..................... 280/777 |
| 5,606,892 A * | 3/1997 | Hedderly ...................... 74/493 |
| 5,669,634 A * | 9/1997 | Heinzman et al. ............ 280/777 |
| 5,820,163 A * | 10/1998 | Thacker et al. .............. 280/775 |
| 6,349,610 B2 * | 2/2002 | Glinowiecki et al. .......... 74/492 |
| 6,575,497 B1 * | 6/2003 | McCarthy et al. ............ 280/777 |
| 6,592,148 B2 * | 7/2003 | Byers et al. .................. 280/777 |
| 6,655,716 B2 * | 12/2003 | Riefe .......................... 280/777 |
| 6,814,373 B2 * | 11/2004 | Munro et al. ................ 280/777 |
| 6,854,765 B2 * | 2/2005 | Heinzman et al. ............ 280/776 |
| 6,942,250 B2 * | 9/2005 | Dubay et al. ................. 280/777 |
| 7,188,867 B2 * | 3/2007 | Gatti et al. ................... 280/777 |
| 2001/0011486 A1 * | 8/2001 | Glinowiecki et al. .......... 74/492 |
| 2002/0124676 A1 | 9/2002 | Kluemper et al. |
| 2003/0102658 A1 * | 6/2003 | McCarthy et al. ............ 280/777 |
| 2004/0217581 A1 * | 11/2004 | Dubay et al. ................ 280/777 |

(Continued)

FOREIGN PATENT DOCUMENTS

JP 3242877 B2 10/2001
JP 3581136 B2 7/2004

*Primary Examiner*—John Q. Nguyen
*Assistant Examiner*—Barry Gooden, Jr.
(74) *Attorney, Agent, or Firm*—Buchanan Ingersoll & Rooney PC (57) ABSTRACT A shock-absorption steering device includes a steering shaft connected to a steering wheel, a column housing for housing and supporting the steering shaft, the steering shaft and the column housing making a telescopic movement in order to absorb an impact energy, the column housing comprised of a first tube and a second tube, a first tube portion formed at the second tube fitted into the first tube, a second tube portion formed at the second tube so that a space is formed between the first tube and the second tube, a plate formed so as to extend in a longitudinal direction of the column housing, one end portion of the plate being bent and fixed to the second tube portion, the other end of the plate not being fixed; and the plate pulled into the space by a predetermined bending load according to a movement of the second tube.

20 Claims, 8 Drawing Sheets

U.S. PATENT DOCUMENTS

| | | | |
|---|---|---|---|
| 2004/0232685 A1* | 11/2004 | Gatti et al. | 280/777 |
| 2005/0247532 A1* | 11/2005 | Grams et al. | 188/371 |
| 2006/0049621 A1* | 3/2006 | Lee | 280/777 |
| 2006/0125224 A1* | 6/2006 | Higashino et al. | 280/777 |
| 2007/0039403 A1* | 2/2007 | Manwaring et al. | 74/492 |

* cited by examiner

SHOCK-ABSORPTION STEERING DEVICE

CROSS REFERENCE TO RELATED APPLICATIONS

This application is based on and claims priority under 35 U.S.C. §119 to Japanese Patent Application 2005-154346 filed on May 26, 2005, the entire content of which is incorporated herein by reference.

FIELD OF THE INVENTION

The present invention generally relates to a shock absorption steering device including an energy absorbing mechanism for absorbing an impact energy that is applied to the steering device in an axial direction of a steering shaft in the event of a vehicle collision.

BACKGROUND

A known shock-absorption steering device (hereinafter referred to as a steering device) disclosed in JP3242877B includes a safety steering column having a column tube on which plural notches are formed on an peripheral surface at an end portion of the column tube in an axial direction thereof. The end portion fits to a conical component member that supports a bearing of a steering shaft.

In this configuration, in the event of a vehicle collision, the notches formed on the column tube starts splitting, and end portions of the column tube are plastically deformed so as to be curled up or split so as to be in a tulip shape in order to absorb the impact energy.

Another type of known shock-absorption device (safety steering column) is disclosed in JP3581136B. Such steering device includes two casing tubes, a first casing tube 3a and a second casing tube. The first casing tube has a larger diameter, and the second casing tube has a smaller diameter. In this configuration, the second casing tube partially fits into the first casing tube by means of a sliding piece.

The sliding piece is pressed to a surface of the second casing tube by an axial tension of a screw that is screwed to the first casing tube.

In this configuration, by adjusting the axial tension of the screw, a displacement force between the first casing tube and the second casing tube, in other words, a load by which the column is retracted in the event of a vehicle collision, is adjusted.

According to the shock-absorption steering device disclosed in JP3242877B, the load in the event of a vehicle collision can be adjusted by changing the number of the notches formed on the column tube or the thickness of the wall of the column tube, however, if the number of the notches is increased or the thickness of the wall is reduced in order to set the level of the load to be low, rigidity of the column tube may be reduced, and discomfort vibrations are more likely to occur at the steering device.

Further, the load is varied depending on the collision stroke by varying the thickness of the wall of the column tube in an axial direction thereof, however, such column tube is not easy to produce.

According to the shock-absorption steering device disclosed in JP3581136B, the load is varied depending on the impact stroke by varying an external diameter of the second casing tube having the smaller diameter, or by varying a friction resistance. Specifically, the friction resistance is varied by varying a roughness of the sliding surface on which the sliding piece slides.

However, even when the load is changed by the above method, it is difficult that the difference of the sliding load is minimized, and such steering tube is not easy to produce.

A need thus exists to provide a shock-absorption steering device by which a level of the load to be absorbed in the event of a vehicle collision can be easily set with high flexibility, the shock-absorption steering device being easily produced.

SUMMARY OF THE INVENTION

According to an aspect of the present invention, a shock-absorption steering device includes a steering shaft connected to a steering wheel, a column housing for housing and supporting the steering shaft so as to be rotatable, the steering shaft and the column housing making a telescopic movement in an axial direction of the steering shaft in order to absorb an impact energy, the column housing comprised of a first tube formed in a tube shape and a second tube formed in a tube shape and partially fitted within the first tube, a first tube portion formed at the second tube in a manner where it has an external diameter that is approximately identical to an internal diameter of the first tube so that the second tube fits into the first tube at the first tube portion, a second tube portion formed at the second tube in a manner where it has an external diameter that is smaller than the external diameter of the first tube portion formed on the second tube so that a space is formed between the first tube and the second tube, a plate formed so as to extend in a longitudinal direction of the column housing from the side of the outer surface of the first tube toward the side of the steering wheel, one end portion of the plate at the side of the steering wheel being bent so as to be formed in an approximately U-shape and fixed to the second tube portion of the second tube, the other end of the plate not being fixed, and the plate pulled into the space formed between the first tube and the second tube by a predetermined bending load on the basis of a movement of the second tube sliding within the first tube.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
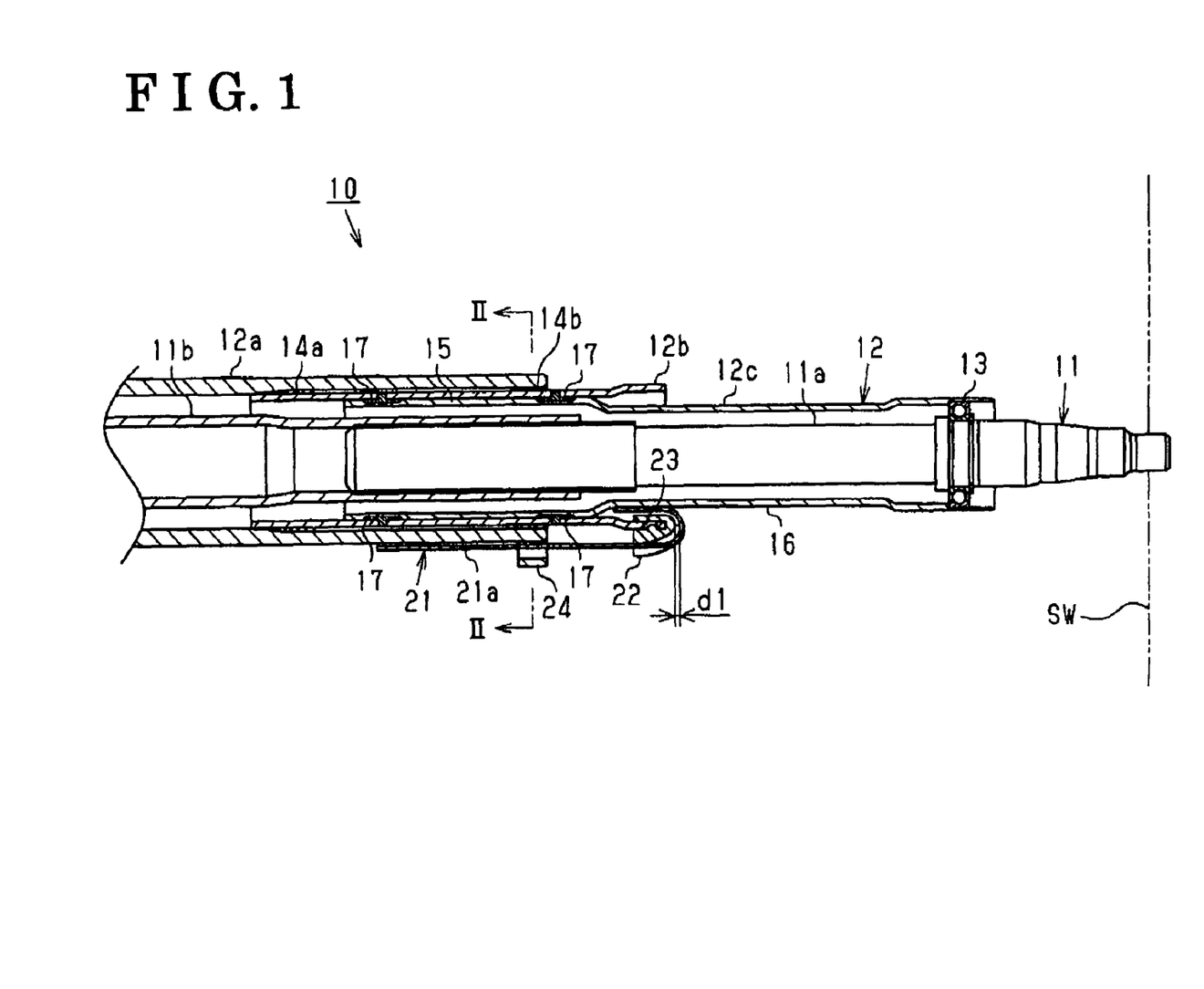
FIG. 1 illustrates a cross section of a shock-absorption steering device in a longitudinal direction thereof.

An embodiment of the present invention will be explained in accordance with FIG. 1 though FIG. 10. FIG. 1 illustrates a cross section indicating a shock-absorption steering device (hereinafter referred to as a steering device) in a longitudinal direction thereof.

The steering device 10 includes a steering shaft 11 and a column housing 12. The column housing 12 is formed in a tube shape for supporting the steering shaft 11 so as to be rotatable. The steering device 10 is supported by a vehicle body by means of a bracket, which is not shown in the drawings.

The steering shaft 11 is supported within the column housing 12 by means of a bearing 13, which is provided at the side of the rear of the vehicle, and by means of another bearing, which is not shown in the drawings, provided at the side of the front of the vehicle, so as to be rotatable and unmovable in an axial direction relative to a lower tube 12b and an upper tube 12c.

The steering shaft 11 is comprised of an upper shaft 11a and a lower shaft 11b. Specifically, the upper shaft 11a is connected to a steering wheel SW at one end of the upper shaft 11a extending toward the rear of the vehicle. The lower shaft 11b is connected to a steering gear mechanism at one end of the lower shaft 11b extending toward the front of the vehicle. The steering gear mechanism is not shown in the drawings.

Figure 2:
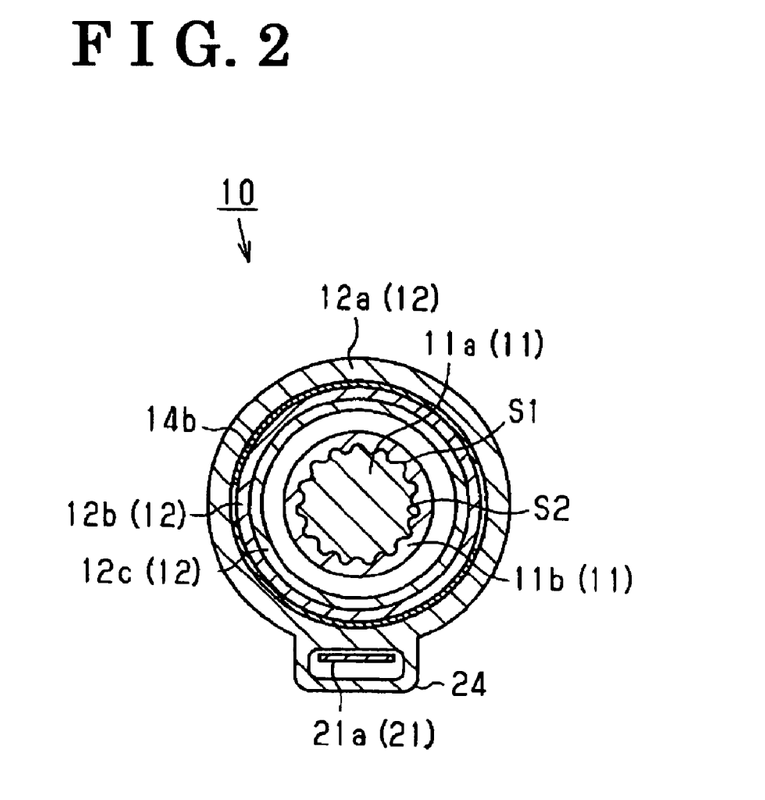
FIG. 2 illustrates a cross section of the shock-absorption steering device shown in FIG. 1 along a II-II line.

As shown in FIG. 2, within an entire fitting portion at which the upper shaft 11a fits to the lower shaft 11b, a spline S1 is formed on the upper shaft 11a, and a spline S2 is formed on the lower shaft 11b. Specifically, the spline S1 is formed on an outer peripheral surface of the upper shaft 11a, and the spline S2 is formed on an inner peripheral surface of the lower shaft 11b, and in this configuration, the spline S1 meshes with the spline S2 so that the upper shaft 11a is assembled to the lower shaft 11b so as to be movable in an axial direction thereof and not rotatable in a circumferential direction thereof, in other words, the upper shaft 11a is assembled to the lower shaft 11b so as to be rotatable together with the lower shaft 11b.

The column housing 12 is comprised of a main tube 12a, a lower tube 12b and an upper tube 12c. Each tube is formed in a tube shape. In this embodiment, a first tube is comprised of the main tube 12a and the lower tube 12b, and a second tube is comprised of the upper tube 12c.

The lower tube 12b extends in a front-rear direction of the vehicle and is inserted into the main tube 12a at one end thereof. Specifically, the lower tube 12b is supported by a pair of bearings 14a and 14b, which are provided at the main tube 12a, so as to be movable in an axial direction of the steering shaft 11. A known telescopic driving means (not shown) is connected to the lower tube 12b so that the lower tube 12b makes a telescopic movement relative to the main tube 12a.

Figure 4:
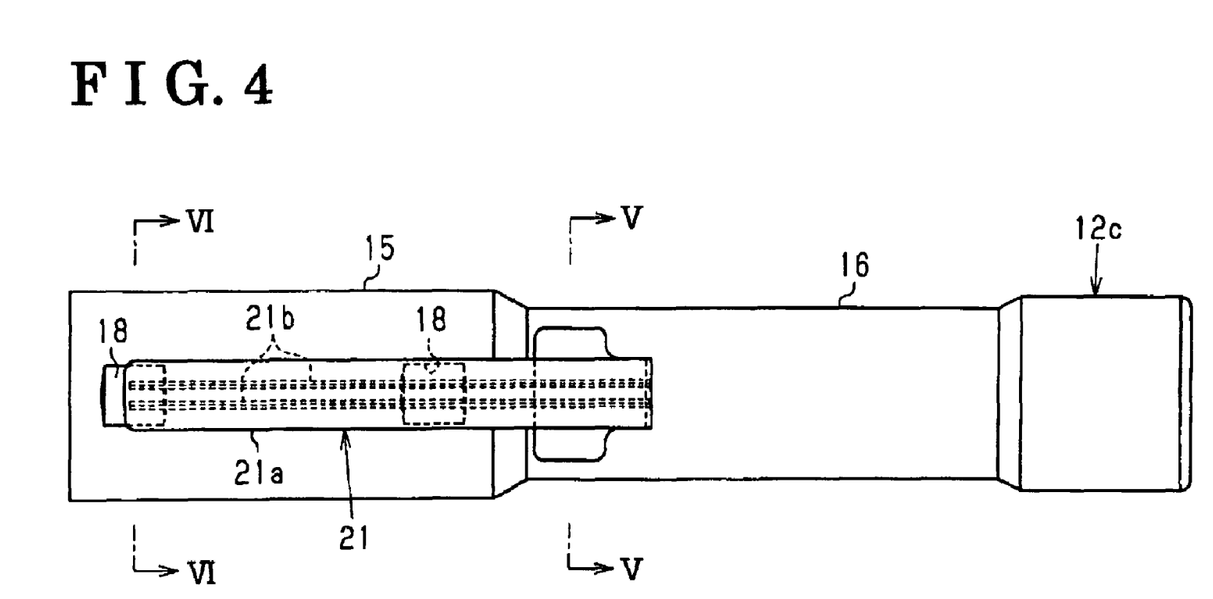
FIG. 4 illustrates a plane view showing an upper tube and a plate fixed to the upper tube.
Figure 5:
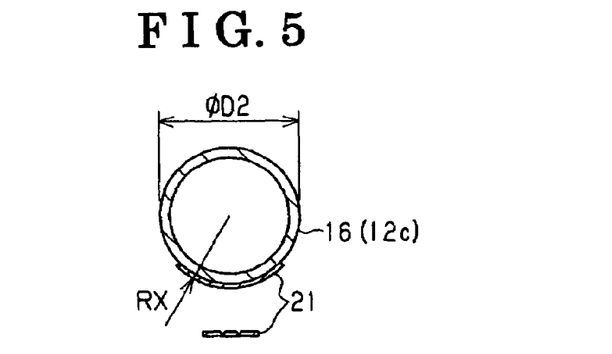
FIG. 5 illustrates a cross section of the upper tube and the plate shown in FIG. 4 along a V-V line.
Figure 6:
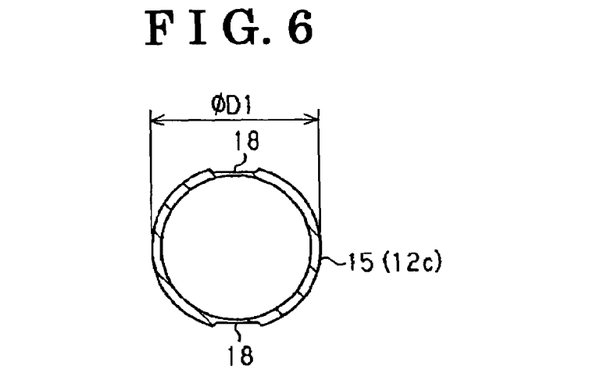
FIG. 6 illustrates a cross section of the upper tube shown in FIG. 4 along a VI-VI line.

As shown in FIG. 4 through FIG. 6, the upper tube 12c includes a first tube portion 15 and a second tube portion 16. Specifically, the first tube portion 15 have an external diameter of ⌀D1 that is approximately identical to an internal diameter of the lower tube 12b, and the second tube portion 16 have an external diameter of ⌀D2 that is smaller than the external diameter ⌀D1 of the first tube portion 15.

The upper tube 12c fits into the lower tube 12b at the first tube portion 15 and engages with the lower tube 12b at the first tube portion 15 by means of a predetermined engaging means, in this embodiment, the upper tube 12c engages with the lower tube 12b by means of resin pins 17. In this configuration, the lower tube 12b is supported by the main tube 12a so as to make a telescopic movement integrally with the upper tube 12c.

Thus, the upper shaft 11a makes a telescopic movement relative to the lower shaft 11b in order to adjust a distance between the driver and the steering wheel SW.

Figure 7:
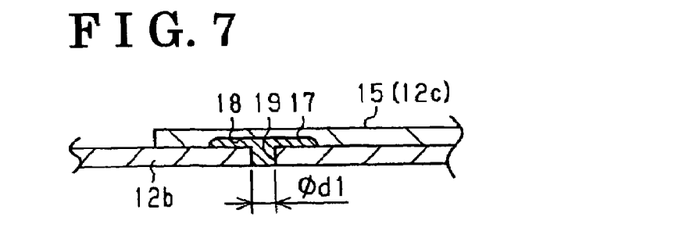
FIG. 7 illustrates an enlarged cross section indicating an example of an engaging means.

In this embodiment, for example, four resin pins 17 are formed on the first tube portion 15 of the upper tube 12c. Specifically, as shown in FIG. 6 and FIG. 7, four flat portions 18 are formed on the upper tube 12c at an outer peripheral surface thereof, and four holes 19 whose diameter are set to ⌀d1 are formed on the lower tube 12b so as to correspond to the flat portions 18. As shown in FIG. 7, resin is injected through each hole 19, and a space formed between the lower tube 12b and the upper tube 12c is filled with the injected resin, and such resin is hardened and the resin pins 17 are formed. Thus, the lower tube 12b engages with the upper tube 12c without any gap therebetween.

In the event of a vehicle collision, when a predetermined load is applied to the steering shaft 11 in an axial direction thereof in a front direction of the vehicle by an inertia force of the steering device 10 itself or by the passenger pressing the steering device through the air bag that is not shown, each resin pin 17 is broken, as a result, the upper tube 12c makes a telescopic movement relative to the lower tube 12b.

The level of the load at which the lower tube 12b breaks away relative to the upper tube 12c can be adjusted by changing the number of the resin pins 17 or changing a value of the diameter ⌀d1 of each hole 19 formed on the lower tube 12b. In the event of a vehicle collision, the lower tube 12b does not make a telescopic movement relative to the main tube 12a.

Further, an energy absorbing mechanism is provided at the upper tube 12c in order to limit the movement of the steering shaft 11 in a front direction thereof by absorbing the impact energy when the steering shaft 11 breaks away as mentioned above, as a result the impact applied to the passenger by the steering wheel SW can be absorbed. In this embodiment, the energy absorbing mechanism is comprised of a plate 21 formed in a plate shape and an attachment 22 serving as an auxiliary portion.

Specifically, the plate 21 is formed in a manner where one end portion in a longitudinal direction thereof is bent in an approximately U-shape, and an end portion of the bent portion is fixed to a second tube portion 16 of the upper tube 12c by means of a fixing means. In this embodiment, the plate 21 is fixed to the upper tube 12c by welding, however, a pin, caulking or riveting may be applied alternatively. While the one end of the plate 21 is fixed to the second tube portion 16 of the upper tube 12c, a long plate portion 21a of the plate 21, which is extending toward another end portion is positioned in a longitudinal direction thereof so as to be along an outer surface of the main tube 12a.

On one surface of the long plate portion 21a facing the outer surface of the upper tube 12c while the plate 21 is fixed to the upper tube 12c, two grooves 21 b are formed so as to continue in a longitudinal direction of the long plate portion 21a and be spaced in a width direction thereof. The number of the groove 21b may be one and more than three.

In the event of a vehicle collision, when the upper tube 12c disengages from the lower tube 12b, and the upper tube 12c moves in a front direction of the vehicle within the lower tube 12b, the long plate portion 21a of the plate 21 is pulled into a space formed between an outer peripheral surface of the upper tube 12c and an inner peripheral surface of the lower tube 12b, specifically between an outer peripheral surface of the second tube portion 16 of the upper tube 12c and the inner peripheral surface of the lower tube 12b.

The attachment 22 is attached to near an opening of the lower tube 12b at the side of the steering wheel SW. Specifically, an engaging hole 23 is formed on the lower tube 12b near the opening, and the attachment 22 is attached to the lower tube 12b so as to be engaged with the engaging hole 23. The plate 21 is provided in a manner where the U-shaped bent portion of the plate 21 is positioned along the attachment 22.

Thus, at the event of the vehicle collision, when the upper tube 12c disengages from the lower tube 12b and moves in a front direction of the vehicle, the plate 21 becomes plastically deformed by means of the attachment 22 and being bending sequentially or bending (ironing) at a predetermined load while the plate 21 slides, and then the plate 21 is pulled into the space formed between the lower tube 12b and the upper tube 12c.

At an initial condition of the plate 21, a distance d1 is set between the attachment 22 and the plate 21 in order to adjust a stroke between the initial condition and the condition where the attachment 22 starts applying an bending (ironing) load to the plate 21, in other words, a stroke between the initial condition and the condition where the plate 21 starts to be bent.

Thus, after a stroke of the collision exceeds the stroke corresponding to the distance d1, the plate 21 is ironed by the attachment 22 at a predetermined bending (ironing) load and then pulled into the space formed between the lower tube 12b and the upper tube 12c.

A plate guide portion 24 is formed at the main tube 12a in order to apply a bending (ironing) load to the plate 21 by means of the attachment 22 appropriately and stably. Because the plate 21 is supported by the plate guide portion 24, when the plate 21 is pulled into the space formed between the lower tube 12b and the upper tube 12c and bent or ironed by means of the attachment 22, chances that the plate 21 becomes in a conditioned indicated by a chain double-dashed line shown in FIG. 3 can be reduced.

The shape of the plate 21 will be described in more detail. As mentioned above, the grooves 21b are formed on the long plate portion 21a of the plate 21. The grooves 21b are formed so as to continue in a longitudinal direction of the long plate portion 21a as shown in FIG. 4. The grooves 21b are formed in order to help that the plate 21 is bent in its width direction when the plate 21 is ironed by means of the attachment 22 and pulled into the space formed between the lower tube 12b and the upper tube 12c smoothly, however, the grooves 21b may not be formed in the configuration of the present invention.

Figure 8:
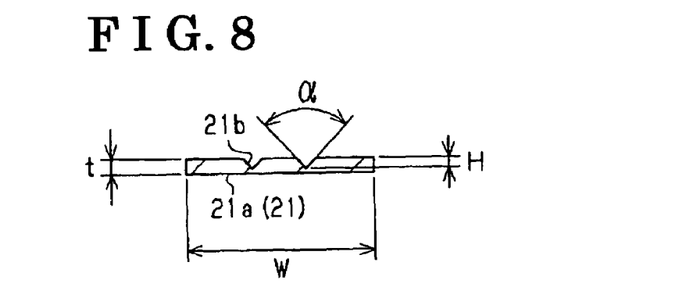
FIG. 8 illustrates a cross section for explaining the plate in detail.

Further, the grooves 21b formed on the plate 21 are also used for setting the bending (ironing) load. Specifically, as shown in FIG. 8, a width of the plate 21 is set to a width W, and a thickness of the plate 21 is set to a thickness t. Further, the number of the grooves 21b provided on the plate 21 in its width direction is set to a groove number n (not shown), a depth of the groove 21b is set to a groove depth H, and an angle of the groove 21b is set to a groove angle $\alpha$. In this configuration, the bending (ironing) load is set to an appropriate predetermined value by adjusting the width W, the thickness t, the groove number n, the groove depth H and the groove angle $\alpha$.

Figure 9A:
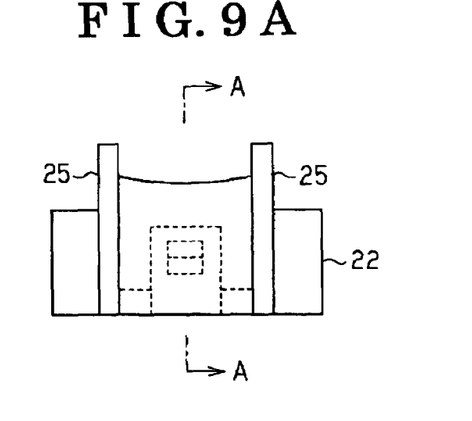
FIG. 9A illustrates a plane view indicating an attachment.
Figure 9B:
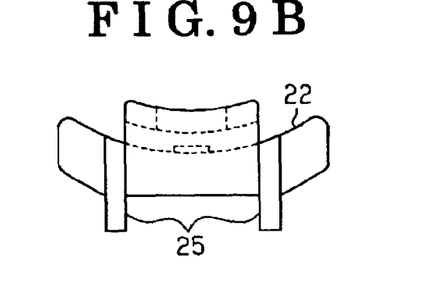
FIG. 9B illustrates a plane view indicating the attachment.
Figure 9C:
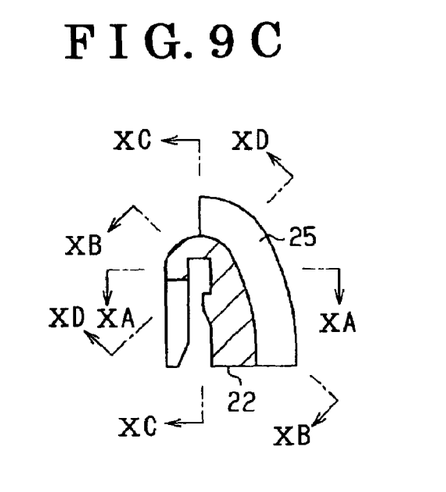
FIG. 9C illustrates a cross section indicating the attachment along a IXC-IXC line in FIG. 9A.
Figure 10A:
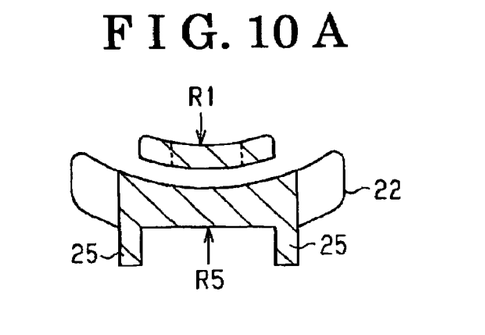
FIG. 10A illustrates a cross section of the attachment along a XA-XA line in FIG. 9C.
Figure 10B:
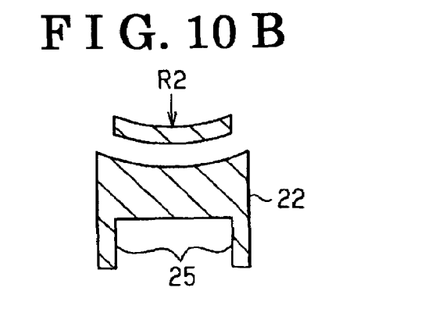
FIG. 10B illustrates a cross section of the attachment along a XB-XB line in FIG. 9C.
Figure 10C:
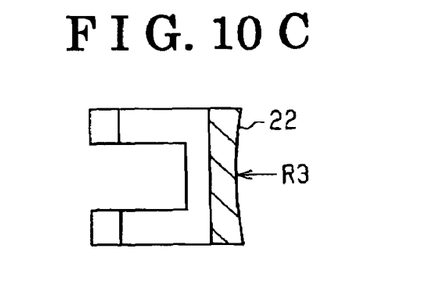
FIG. 10C illustrates a cross section of the attachment along a XC-XC line in FIG. 9C.
Figure 10D:
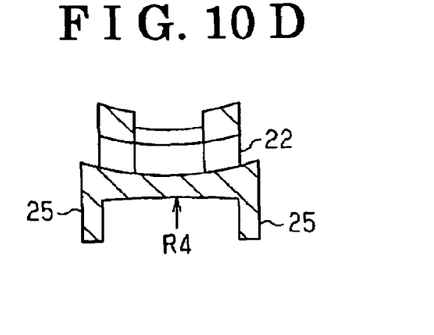
FIG. 10D illustrates a cross section of the attachment along a XD-XD line in FIG. 9C.

The shape of the attachment 22 will be described in detail in accordance with FIG. 9A, FIG. 9B and FIG. 9C. Guide pieces 25 are formed at the attachment 22 in order to guide the plate 21 so as to be pulled into the space formed between the upper tube 12c and the lower tube 12b. By virtue of the guide pieces 25, the plate 21 can slide on the attachment 22 while the plate 21 is limited so as not to move in a right-left direction (perpendicular direction relative to an axial) thereof.

As shown in FIG. 10A through FIG. 10D, the curvature on the sliding surface of the attachment 22 varies corresponding to a curvature 1/RX of a cross section of the upper tube 12c (RX indicates a curvature radius as shown in FIG. 5) so as to be gradually increased within the sliding stroke from the outer surface side of the main tube 12a to the space between the upper tube 12c and the lower tube 12b.

In other words, when the curvature radius of the sliding surface of the plate 21 are set so as to be R1, R2, R3, R4 and R5, the curvatures 1/R1, 1/R2, 1/R3, 1/R4 and 1/R5 are set so as to fulfill a formula, $1/RX \geq 1/R1 > 1/R2 > 1/R3 > 1/R4 > 1/R5$.

More specifically, the curvature corresponding to 1/R1 at the end point on the sliding surface is set so as to be approximately identical to the curvature 1/RX of a cross section of the upper tube 12c, in other words, a curvature of a cross section of the space.

Thus, the plate 21 is ironed in a manner where it is bent (plastically deformed) in its width direction so that the plate 21 is smoothly pulled into the space formed between the upper tube 12c and the lower tube 12b.

Figure 3:
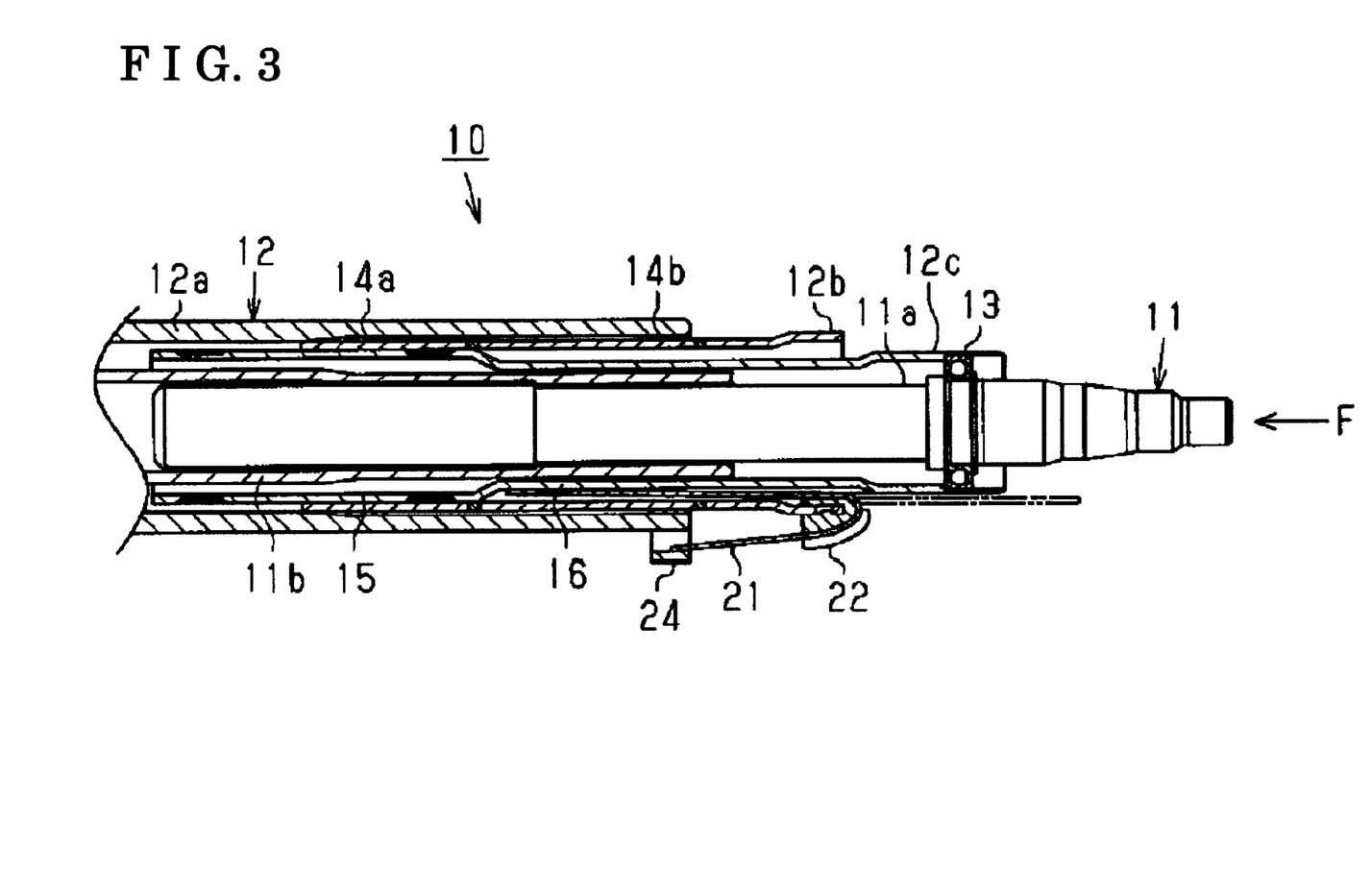
FIG. 3 illustrates a cross section of the shock-absorption steering device in a longitudinal direction thereof in the event of a vehicle collision.

An actuation of the steering device 10 configured as mentioned above will be explained. As shown in FIG. 3, suppose a predetermined load F whose level exceeds a preset load is applied to the steering shaft 11 in an axial direction thereof in the front direction of the vehicle when a passenger presses the steering device 10 or by an inertia force of the steering device 10 itself in the event of a vehicle collision.

At this point, the upper tube 12c that has been engaged with the upper shaft 11a by means of the resin pins 17 is disengaged from the upper shaft 11a, and the upper tub 12c moves integrally with the upper shaft 11a in the front direction of the vehicle relative to the lower tube 12b and the lower shaft 11b. When the distance of this movement, in other words a collision stroke, exceeds the distance d1 (shown in FIG. 1) set between the attachment 22 and the plate 21, the plate 21 is plastically deformed by means of the attachment 22 so as to be ironed and pulled into the space formed between the lower tube 12b and the upper tube 12c.

Because the sliding surface of the attachment 22 is formed in a manner where its curvature becomes gradually larger within its sliding stroke, the plate 21 is smoothly pulled into the space formed between the lower tube 12b and the upper tube 12c.

Further, by virtue of the plate guide portion 24, chances that the plate 21 becomes in the shape that is shown in FIG. 3 with the chain double-dashed line can be reduced, as a result, the impact energy in the event of the vehicle collision can be effectively absorbed.

In the event of a vehicle collision, when the upper tube 12c that has been engaged with the lower tube 12b by means of the engaging means (resin pin 17) becomes disengaged from the lower tube 12b and moves in the front direction of the vehicle within the lower tube 12b, the plate 21 is pulled into the space formed between the upper tube 12c and the lower tube 12b by the predetermined bending (ironing) load.

In this configuration, a level of the load to be absorbed in the event of a vehicle collision is set with highly flexibility to a predetermined load by adjusting the width W, the thickness t, the groove number n, the groove depth H and the groove angle a, without reducing the rigidity of the column housing 12, in other words without changing the level of the thickness of the wall of the column housing 12, for example. Such plate 21 can be processed easily.

The plate 21 is plastically deformed or slid by means of the attachment 22 so as to be ironed at a predetermined bending (ironing) load and pulled within the space formed between the lower tube 12b and the upper tube 12c. The curvature of the sliding surface of the attachment 22 at which the plate 21 slide is set in a manner where it becomes gradually larger within the sliding stroke from the side of the outer surface of the main tube 12a to the side of the inner of the space formed between the lower tube 12b and the upper tube 12c. Thus, the plate is smoothly pulled into the space between the lower tube 12d and the upper tube 12c.

The distance d1 is provided between the plate 21 and the attachment 22 in order to adjust the stroke between the initial condition and the condition where the attachment 22 starts applying an bending (ironing) load to the plate 21, in other words a stroke between the initial condition and the condition where the plate 21 starts to be ironed.

After a moving distance of the upper tube 12c relative to the lower tube 12b, in other words a stroke of the collision, exceeds a stroke corresponding to the distance d1, the plate 21 starts to be ironed by the attachment 22 at a predetermined bending (ironing) load and then pulled into the space formed between the lower tube 12b and the upper tube 12c. Thus, the stroke at which the bending (ironing) load is applied to the plate 21 can be arbitrarily set.

Because the plate guide portion 24 is provided at the main tube 12a in order to support the plate 21, when the bending (ironing) load is applied to the plate 21, the plate 21 can be ironed appropriately and stably.

According to this embodiment, because plural grooves 21b, for example two grooves 21b, are continuously formed at the plate 21 in a longitudinal direction thereof, it becomes easy that the plate 21 is bent in its width direction so that the plate 21 can be smoothly pulled into the space formed between the upper tube 12c and the lower tube 12b.

This embodiment can be modified as follows.

The steering device may not include the telescopic driving means. Specifically, the lower tube 12b may be replaced by the main tube 12a, and the column housing 12 is comprised of the main tube 12a and the upper tube 12c.

Figure 11:
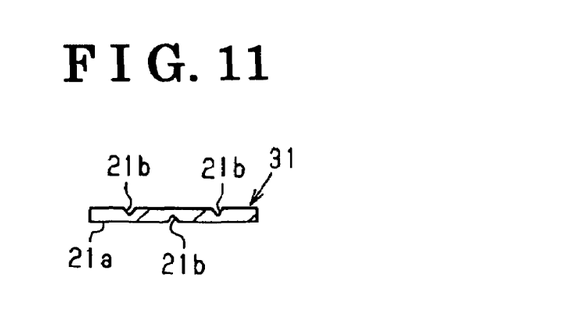
FIG. 11 illustrates a cross section indicating another configuration of the shock absorption plate.

The plate 21 may be modified to a plate 31 that is shown in FIG. 11. Specifically, the plate 31 includes a long plate portion 21a and grooves 21b, and the grooves 21b are formed on both sides of the long plate portion 21a of the plate 31.

More specifically, when the plate 31 is fixed at the upper tube 12c at one end of the plate 31, two grooves 21b are formed on one surface of the plate 31, the surface facing the outer surface of the upper tube 12c, and one groove is formed on the other surface of the plate 31. The number of the grooves 21b may be changed. In this configuration, it becomes more easily that the plate 31 is bent in its width direction, and the level of the load can be arbitrary set.

Figure 12:
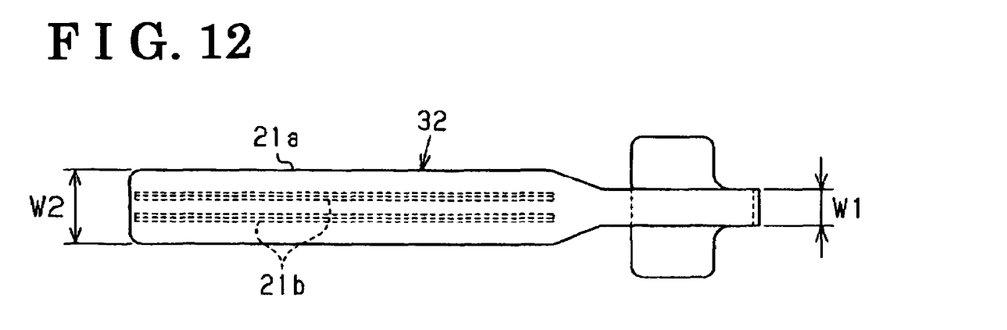
FIG. 12 illustrates a flat view section indicating another configuration of the shock absorption plate.

The plate 21 may be modified to a plate 32 that is shown in FIG. 12. Specifically, the plate 32 is similar to the plate 21 except having a width W1 and a width W2 in a manner where the width W1 gradually changes in a longitudinal direction to the width W2. In this configuration, the bending (ironing) load applied to the plate 32 can be changed depending on the width W1 and the width W2. The configuration of the plate 32 may be changed, for example, the width of the plate 32 may be modified in a longitudinal direction thereof so that the level of the load can be set at an arbitrary collision stroke.

Figure 13:
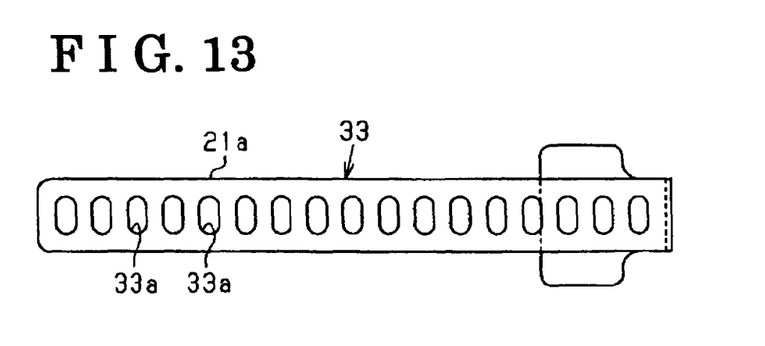
FIG. 13 illustrates a flat view section indicating another configuration of the shock absorption plate.

The plate 21 may be modified to a plate 33 that is shown in FIG. 13. Specifically, the plate 33 includes a long plate portion 21a, and plural long holes 33a are formed on the long plate portion 21a so as to be spaced at a predetermined distance in a longitudinal direction. Each of the long holes 33a extends in a width direction of the long plate portion 21a. In this configuration, it becomes more easily that the plate 33 is bent in its width direction, and the level of the load can be arbitrary set.

Figure 14:
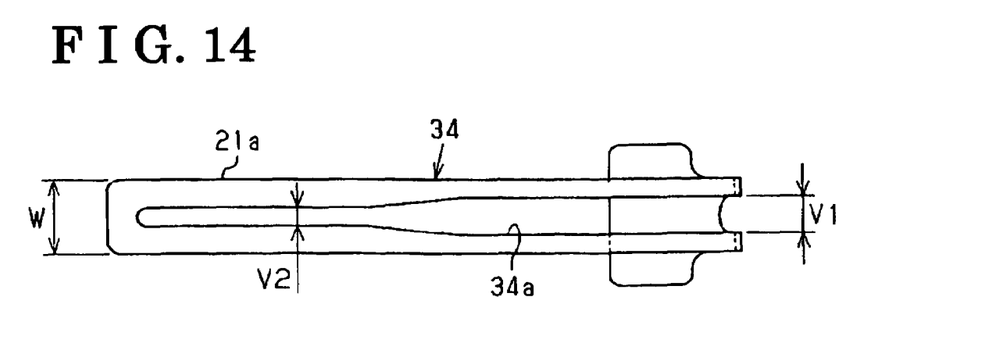
FIG. 14 illustrates a flat view section indicating another configuration of the shock absorption plate.

The plate 21 may be modified to a plate 34 that is shown in FIG. 14. Specifically the plate 34 includes a long plate portion 21a, and a long hole 34a is formed on the long plate portion 12a so as to be recessed and continued in a longitudinal direction of the long plate portion 21a at a central portion thereof. More specifically, the long hole 34 includes a width V1 and a width V2 in a manner where the width V1 gradually changes in a longitudinal direction to the width V2.

In this configuration, it becomes more easily that the plate 34 is bent in its width direction, and the bending (ironing) load applied to the plate 34 can be changed depending on the width V1 and the width V2. The configuration of the plate 34 may be changed, for example, the width of the long hole 34a may be modified in a longitudinal direction thereof so that the level of the load can be set at an arbitrary collision stroke.

Figure 15:
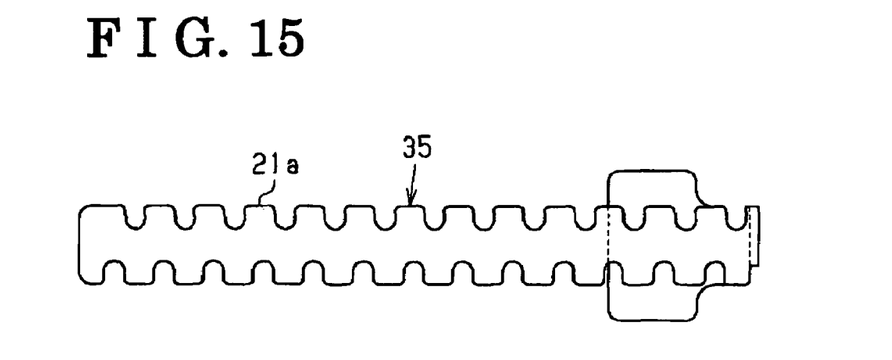
FIG. 15 illustrates a flat view section indicating another configuration of the shock absorption plate.
Figure 16:
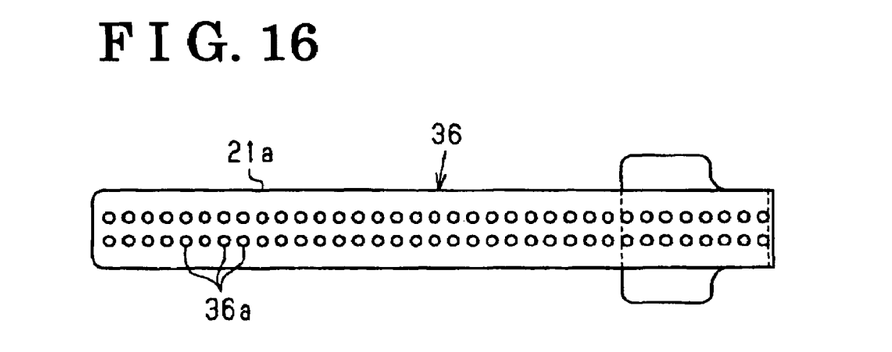
FIG. 16 illustrates a flat view section indicating another configuration of the shock absorption plate.

The plate 21 may be modified to a plate 35 that is shown in FIG. 15. Specifically, the plate 35 includes a long plate portion 21a, and each side of the long plate portion 21a in width direction thereof is formed in a waved shape. In other words, the width of the plate 35 continuously varies in a longitudinal direction thereof. In this configuration, it becomes more easily that the plate 35 is bent in its width direction, and the level of the load can be arbitrary set The plate 21 may be modified to a plate 36 that is shown in FIG. 16. Specifically, the plate 36 includes a long plate portion 21a, and plural holes 36a are formed on the long plate portion 21 a so as to be spaced at a predetermined distance in a longitudinal direction. In this embodiment, two lines of the holes are provided at the long plate portion 21a so as to be paired in a width direction of thereof. Such holes 36a may be formed in a grooved shape. In this configuration, it becomes more easily that the plate 36 is bent in its width direction, and the level of the load can be arbitrary set.

In the above mentioned embodiment and the modified embodiments, the configurations of the plates may be combined and used. The material, number and position of the resin pin 17 may be changed. The engaging means is not limited to the resin pin 17, and known technology may be applied to the engaging means.

The plate guide portion 24 may be provided to the attachment 22 so as to be integral. The curvature of the sliding surface of the attachment 22 on which the plate 21 slides may not be gradually changed and may be constant, as far as the plate 21 is pulled into the space between the upper tube 12c and the lower tube 12b.

The attachment 22 may not be provided. The plate 21 may be guided by means of the end portion of the lower tube 12b at the side of the steering wheel SW instead of the attachment 22.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A shock-absorption steering device comprising:
   a steering shaft connected to a steering wheel;
   a column housing for housing and supporting the steering shaft so as to be rotatable;
   the steering shaft and the column housing making a telescopic movement in an axial direction of the steering shaft in order to absorb an impact energy;
   the column housing including a first tube formed in a tube shape and a second tube formed in a tube shape and partially fitted within the first tube;
   a first tube portion formed at the second tube in a manner where it has an external diameter that is approximately identical to an internal diameter of the first tube so that the second tube fits into the first tube at the first tube portion;
   a second tube portion formed at the second tube in a manner where it has an external diameter that is smaller than the external diameter of the first tube portion formed on the second tube so that a space is formed between the first tube and the second tube;
   a plate formed so as to extend in a longitudinal direction of the column housing from the side of the outer surface of the first tube toward the side of the steering wheel; and
   one end portion of the plate at the side of the steering wheel being bent so as to be formed in an approximately U-shape and fixed to the second tube portion of the second tube;
   the other end of the plate not being fixed; and
   the plate pulled into the space formed between the first tube and the second tube by a predetermined bending load on the basis of a movement of the second tube sliding within the first tube.

2. The shock-absorption steering device according to claim 1, wherein, at an end portion of the first tube at the side of the steering wheel, an auxiliary portion is provided in order to apply the predetermined bending load to the plate while the plate is plastically deformed and slid thereon, and a curvature of a sliding surface of the auxiliary portion is set so as to be gradually increased within a sliding stroke from the side of the outer surface of the first tube to the space formed between the first tube and the second tube.

3. The shock-absorption steering device according to claim 2, wherein a distance is formed between the plate and the auxiliary portion while the plate is set so as to be in its initial condition in order to adjust a stroke between the initial condition of the plate and a condition where the bending load starts to be applied to the plate.

4. The shock-absorption steering device according to claim 1, wherein a plate guide portion is provided at the first tube in order to support the plate while the bending load is applied to the plate.

5. The shock-absorption steering device according to claim 2, wherein a plate guide portion is provided at the first tube in order to support the plate while the bending load is applied to the plate.

6. The shock-absorption steering device according to claim 3, wherein a plate guide portion is provided at the first tube in order to support the plate while the bending load is applied to the plate.

7. The shock-absorption steering device according to claim 1, wherein plural grooves or plural holes are formed on the plate in a manner where the grooves or the plural holes are spaced at a predetermined distance in a longitudinal direction thereof.

8. The shock-absorption steering device according to claim 2, wherein plural grooves or plural holes are formed on the plate in a manner where the grooves or the plural holes are spaced at a predetermined distance in a longitudinal direction thereof.

9. The shock-absorption steering device according to claim 3, wherein plural grooves or plural holes are formed on the plate in a manner where the grooves or the plural holes are spaced at a predetermined distance in a longitudinal direction thereof.

10. The shock-absorption steering device according to claim 4, wherein plural grooves or plural holes are formed on the plate in a manner where the grooves or the plural holes are spaced at a predetermined distance in a longitudinal direction thereof.

11. The shock-absorption steering device according to claim 1, wherein a long hole is formed in a groove shape on the plate so as to extend continuously in a longitudinal direction thereof.

12. The shock-absorption steering device according to claim 2, wherein a long hole is formed in a groove shape on the plate so as to extend continuously in a longitudinal direction thereof.

13. The shock-absorption steering device according to claim 3, wherein a long hole is formed in a groove shape on the plate so as to extend continuously in a longitudinal direction thereof.

14. The shock-absorption steering device according to claim 4, wherein a long hole is formed in a groove shape on the plate so as to extend continuously in a longitudinal direction thereof.

15. The shock-absorption steering device according to claim 10, wherein the long hole is formed in a manner where a width thereof varies in its longitudinal direction.

16. The shock-absorption steering device according to claim 1, wherein the plate is formed in a manner where a width thereof varies in its longitudinal direction.

17. The shock-absorption steering device according to claim 2, wherein the plate is formed in a manner where a width thereof varies in its longitudinal direction.

18. The shock-absorption steering device according to claim 3, wherein the plate is formed in a manner where a width thereof varies in its longitudinal direction.

19. The shock-absorption steering device according to claim 4, wherein the plate is formed in a manner where a width thereof varies in its longitudinal direction.

20. The shock-absorption steering device according to claim 5, wherein the plate is formed in a manner where a width thereof varies in its longitudinal direction.

* * * * *